United States Patent
Kodate et al.

(10) Patent No.: US 6,704,084 B2
(45) Date of Patent: Mar. 9, 2004

(54) LIQUID-CRYSTAL DISPLAY WHEREIN A COMMON POTENTIAL IS SUPPLIED TO AN ALIGNMENT FILM

(75) Inventors: Manabu Kodate, Yokohama (JP); Shinichi Kimura, Yokohama (JP); Kaoru Kusafuka, Kawasaki (JP); Hidehisa Shimizu, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/802,689

(22) Filed: Mar. 9, 2001

(65) Prior Publication Data

US 2001/0033354 A1 Oct. 25, 2001

(30) Foreign Application Priority Data

Mar. 16, 2000 (JP) ................................. 2000-074608
Mar. 17, 2000 (JP) ................................. 2000-075565

(51) Int. Cl.⁷ ..................... G02F 1/1343; G02F 1/1337
(52) U.S. Cl. ................... 349/141; 349/143; 349/123
(58) Field of Search ..................... 349/141, 143, 349/123, 124, 40

(56) References Cited

U.S. PATENT DOCUMENTS

| | | | | |
|---|---|---|---|---|
| 5,949,511 A | * | 9/1999 | Park | 349/139 |
| 6,177,970 B1 | * | 1/2001 | Kim | 349/43 |
| 6,281,957 B1 | * | 8/2001 | Oh et al. | 349/141 |
| 6,400,436 B1 | * | 6/2002 | Komatsu | 349/141 |
| 6,445,435 B1 | * | 9/2002 | Seo et al. | 349/141 |

FOREIGN PATENT DOCUMENTS

| | | | |
|---|---|---|---|
| JP | 02-033946 | 2/1997 | G02F/1/136 |
| JP | 09-236822 | 9/1997 | G02F/1/136 |
| JP | 10-123526 | 5/1998 | G02F/1/1337 |
| JP | 10-186391 | 7/1998 | G02F/1/343 |
| JP | 10-186407 | 7/1998 | G02F/1/136 |
| JP | 10-301141 | 11/1998 | G02F/1/136 |
| JP | 2000-066210 | 3/2000 | G02F/1/1337 |
| JP | 2000-075303 | 3/2000 | G02F/1/1339 |
| JP | 2000-284319 | 10/2000 | G02F/1/136 |
| JP | 2001-083537 | 3/2001 | G02F/1/1343 |
| JP | 2001-109015 | 4/2001 | G02F/1/1365 |
| JP | 2001-183699 | 7/2001 | G02F/1/1365 |
| JP | 2001-242490 | 9/2001 | G02F/1/1368 |

* cited by examiner

*Primary Examiner*—Tarifur R. Chowdhury
*Assistant Examiner*—Mike Qi
(74) *Attorney, Agent, or Firm*—Robert M. Trepp

(57) ABSTRACT

A circumferential area of a liquid-crystal cell is provided with a common wiring, a gate wiring, a source wiring, and an alignment film. The alignment film is insulated from the gate wiring and the source wiring by an insulating film. The common wiring is provided with a common-potential exposure portion through an opening formed on the insulating film and electrically connected with the alignment film. Because a common potential close to an average potential of cells is supplied to the alignment film, it is possible to prevent screen display troubles and deterioration caused by impurity ions remaining on the surface or the inside of the alignment film.

9 Claims, 8 Drawing Sheets

LIQUID-CRYSTAL DISPLAY WHEREIN A COMMON POTENTIAL IS SUPPLIED TO AN ALIGNMENT FILM

BACKGROUND OF THE INVENTION

1. Field of the Invention

The present invention relates to a liquid-crystal display, particularly to a liquid-crystal display in which a potential of an alignment film is controlled.

2. Discussion of Related Art

Liquid-crystal displays of various modes have been developed so far. For example, there are TN (Twisted Nematic) mode and VA (Vertical Alignment) mode. The TN mode seals a nematic liquid crystal having a positive dielectric anisotropy between two glass substrates and twists an arrangement of liquid crystals by using an alignment film formed on both the substrates. By applying an electric field to the liquid crystals, the arrangement of the liquid crystals is controlled in the vertical direction to perform screen display by using polarization of transmitted light. The VA mode arranges liquid crystals having negative dielectric anisotropy in a direction vertical to a glass substrate. Transmission of light is controlled by applying an electric field to the liquid crystals and thereby tilting the direction of the liquid crystals.

In addition to liquid-crystal displays having the above modes, a liquid-crystal display is known which has a mode referred to as IPS (In Plane Switching) developed to improve a viewing angle. The liquid-crystal display controls transmission of light by operating a direction of a liquid crystal in a plane parallel with a glass substrate and has a structure in which electrodes for applying an electric field to liquid crystals are formed on the same substrate. FIG. 7 shows a conventional IPS-mode TFT liquid-crystal display, which is an illustration showing a configuration of one of sub-pixel portions arranged like a matrix in a display pixel area on a TFT array substrate. In FIG. 7, reference numeral 702 denotes a plurality of pairs of common wirings extending in one direction in parallel with each other and 703 denotes gate wirings extending in one direction in parallel with each other and arranged in parallel with the common wirings.

Reference numeral 704 denotes a plurality of source wirings extending in one direction in parallel with each other and arranged in a direction almost orthogonal to the common wiring 702 and the gate wiring 703. Reference numeral 705 denotes a sub-pixel portion that is enclosed by the common wiring 702, gate wiring 703, and source wiring 704. Reference numeral 706 denotes a TFT serving as a switching device. The TFT 706 is constituted by arranging a source electrode 707 extending along the gate wiring 703 from the source wiring 704 and a drain electrode 708 in parallel with each other at both the sides of a constant channel 709. The gate wiring 703 is formed below the channel 709 formed of a semiconductor layer through an insulating film (not illustrated).

Two common electrodes 710 extend downward in FIG. 7 from the common wiring 702 along two source wirings 704 while the drain electrode 708 of the TFT 706 is connected to a pixel electrode 711. The pixel electrode 711 extends upward in parallel with these two common electrodes 710 between two common electrodes 710. Moreover, a plurality of pairs of parallel electrodes are formed in one pixel and contrast of pixels is produced by controlling an orientation of liquid crystals in accordance with the intensity of an electric field between these electrodes to provide a display screen. Some of electric charges supplied to the pixel electrode 711 from the source wiring 704 through the TFT 706 are held by a storage capacitance 712.

Though not shown in FIG. 7, it is needless to say that similarly to an ordinary TFT liquid-crystal display an alignment film is formed on a TFT array substrate having the above configuration and surfaces of counter substrates arranged in parallel with each other separately from the array substrate by a predetermined gap and the gap between these two substrates is filled with liquid crystal. Moreover, the portion shown in FIG. 7 shows a pixel portion of each of R, G, and B constituting one pixel when performing color displaying.

FIG. 8 is a sectional view showing a configuration of a liquid-crystal cell of a conventional IPS-mode TFT liquid-crystal display. Reference numeral 801 denotes a liquid-crystal cell having a function for displaying video information on a screen as the information of light transmittance of the pixel 705 by electrooptically converting an electrical signal including the video information input from a driving circuit. Reference numeral 802 denotes a TFT array substrate. A signal input from a driving circuit is distributed to the pixel electrode 711 through the gate wiring 703, source wiring 704, and TFT 706. The sub-pixels 705 are arranged in a display pixel area 817 like a matrix. A common potential is distributed to the common electrode 710 in the pixel 705 through a common-potential supply wiring 819 and the common wiring 702.

A gate insulating film 804 and a passivation film 805 are formed on the TFT array substrate 802. Reference numeral 803 denotes a counter substrate. The following are formed on the counter substrate 803: a black matrix 807 for shading a boundary portion of the pixel 705 and a display-screen circumferential area 818, a color filter 808 for dividing light into three primary colors of R, G, and B, and a protective film 809. The TFT array substrate 802 and the counter substrate 803 are arranged in parallel with each other while keeping a predetermined gap between them and liquid crystal 810 is sealed between them. An alignment film 806 for determining the initial orientation of the liquid crystal 810 is formed on faced surfaces of two substrates. Moreover, a polarization film 811 is formed on the outside surfaces of two substrates.

Because potentials different from each other are supplied to the common electrode 710 and the pixel electrode 711, an electric field is generated between the two electrodes, the electric field works on the liquid crystal 810 whose initial orientation is determined by the alignment film 806 in a direction different from the direction of the electric field and orientations of the liquid crystal are changed. In this case, the way of change of orientations of liquid crystal depends on the intensity of an electric field. When polarized light obtained after the light emitted from the backlight 812 passes through the polarization film 811, passes through the layer of the liquid crystal 810, intensities of the light can be changed due to orientation change of liquid crystal. Therefore, it is possible to change intensities of the light emitted from the other polarization film 811. Thereby, it is possible to change the information of an electrical signal to the information of intensity of light.

In the case of the conventional IPS-mode TFT liquid-crystal display shown in FIGS. 7 and 8, an alignment film is electrically floated as an insulating film is present between two electrodes and the alignment film in the display pixel area on the TFT array substrate. The two electrodes are for supplying an electric field to liquid crystal, that is, a pixel electrode and a common electrode. The alignment film is for providing initial orientation for liquid-crystal molecules. Moreover, because only materials having a high electric resistance are formed on a counter substrate, an alignment film formed on the counter substrate is also electrically floated. In the case of the above electrically insulated alignment film, there is a deviation in the direction of an electric field passing through an alignment film. Thereby, impurity ions corresponding to the direction of the electric field are easily collected on the film. Because ions are originally easily adsorbed by an alignment film, a screen display trouble such as an after-image or image-sticking occurs due to collected impurity ions.

Moreover, in a circumferential area nearby a display pixel area, particularly an area for extending a gate wiring to a driving circuit, the gate-wiring density is high compared to other areas. Therefore, because a gate-wiring potential whose average potential is approx. 10V lower than the average potential in a screen is predominant, an electric field passing through an alignment film is large and deviated. Thus, it is newly found that impurity ions are easily collected on an alignment film formed through an insulating film thereon. Therefore, the electric-charge holding characteristic of a pixel is easily deteriorated along the circumference of a display screen and this causes display blur or the like. This area has the same display blur problem because an alignment film on a TFT array substrate is electrically insulated in the case of not only an IPS-mode TFT liquid-crystal display but also TN-mode and VA-mode TFT liquid-crystal displays.

To solve the above problem, it is disclosed in Published Unexamined Patent Application No. 10-301141 to make an alignment film directly contact with an electrode wiring without forming an insulating film between them. In the case of the above invention, however, because a pixel electrode and a common electrode are electrically connected with an alignment film in a pixel, a large problem occurs if there is a defect such as disconnection or short circuit in the pixel electrode. Because a gate potential is supplied to the alignment film when the pixel electrode connects with a gate wiring. Moreover, this example does not disclose a method for preventing image-sticking or display blur in a display circumferential area at all.

Moreover, it is disclosed in Published Unexamined Patent Application No. 4-359222 to form a hole on an alignment film and an insulating film and electrically connect an electrode with liquid crystal. However, this invention does not relate to an active-matrix-type liquid-crystal display or does not disclose the knowledge on the above problem at all.

The present invention is made to solve the above problems and its object is to provide a liquid-crystal display for realizing a high-quality and high-reliability screen display. It is another object of the present invention to provide a liquid-crystal display capable of controlling image-sticking and display blur.

It is still another object of the present invention to provide a liquid-crystal display capable of preventing defects due to impurity ions in an alignment film. It is still another object of the present invention to provide a liquid-crystal display capable of preventing defects due to impurity ions in an alignment film without being influenced by a defect such as disconnection or short circuit in a pixel electrode. It is still another object of the present invention to provide a liquid-crystal display capable of preventing defects due to impurity ions in a circumferential area. It is still another object of the present invention to provide a liquid-crystal display capable of efficiently supplying a common potential to an alignment film.

SUMMARY OF THE INVENTION

A liquid-crystal display of the present invention supplies a common potential to an alignment film in a sub-pixel portion, preferably forms an opening on an insulating film formed between an alignment film and a common electrode wiring and electrically connects the alignment film with the common electrode wiring through the opening. A pixel electrode wiring is insulated from the alignment film in the sub-pixel portion.

Preferably, an opening is formed between a common wiring and an alignment film or between a common electrode wiring and an alignment film. Preferably, an alignment film is connected with a common wiring through a conductor portion and more preferably, the conductor portion is formed by exceeding the common electrode wiring and the alignment film is electrically connected with the conductor portion by contacting the conductor portion.

In the case of a liquid-crystal display of the present invention, a common potential is supplied to an alignment film in a circumferential area formed on the circumference of a display screen area. The alignment film is insulated from a gate wiring in the circumferential area. Preferably, the alignment film is electrically connected to a common wiring through an opening formed on an insulating layer.

Further preferably, the alignment film is connected with the common wiring through a conductor portion. The conductor portion is formed by exceeding the common wiring and the alignment film is electrically connected with the conductor portion by contacting the conductor portion. The liquid-crystal display includes display units such as a liquid-crystal cell, liquid-crystal module, and liquid-crystal display.

DETAILED DESCRIPTION OF PREFERRED EMBODIMENTS

Figure 1:
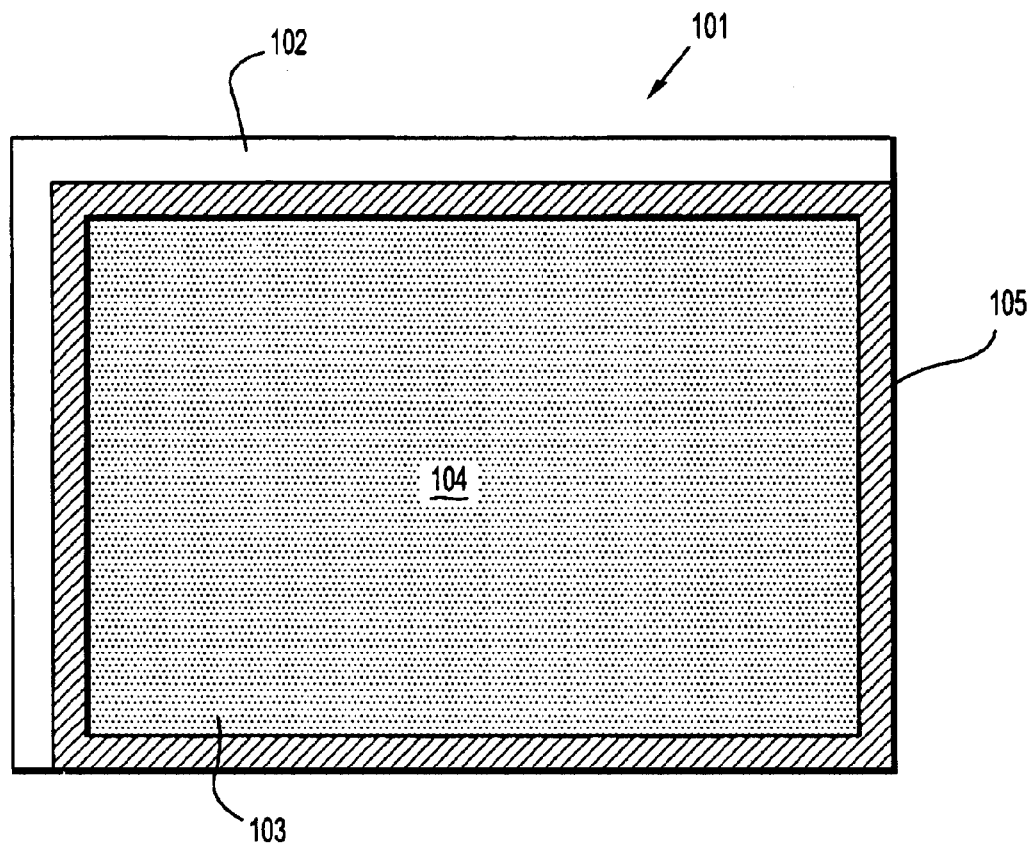
FIG. 1 is a schematic view showing a liquid-crystal cell of this embodiment.

FIG. 1 is a schematic view showing the whole structure of a liquid-crystal cell 101 of the IPS-mode TFT liquid-crystal display of this embodiment. The liquid-crystal cell 101 is constituted of a TFT array substrate 102 and a color filter substrate 103 serving as a counter substrate. In FIG. 1, reference numeral 104 denotes a display pixel area constituted of a plurality of sub-pixel portions arranged like a matrix. This area serves as a display screen. A sub-pixel portion is a constituting portion held by a part of each of two substrates. Reference numeral 105 denotes a display-screen circumferential area formed around the display pixel area 104. In this area, a wiring to the display pixel area 104 or the like is formed but it does not directly contribute to screen displaying.

Figure 2:
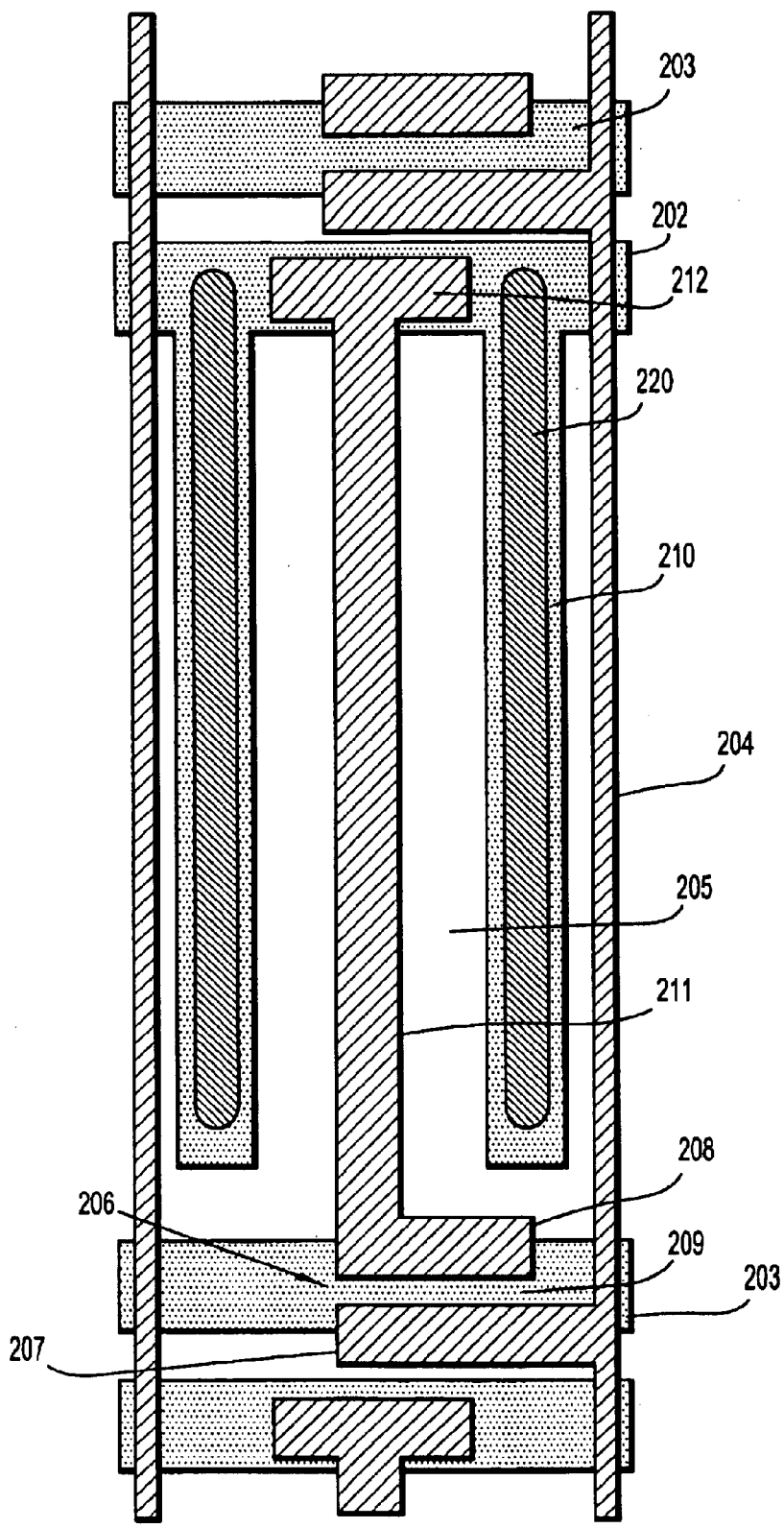
FIG. 2 is a schematic view showing a sub-pixel portion of this embodiment.
Figure 3:
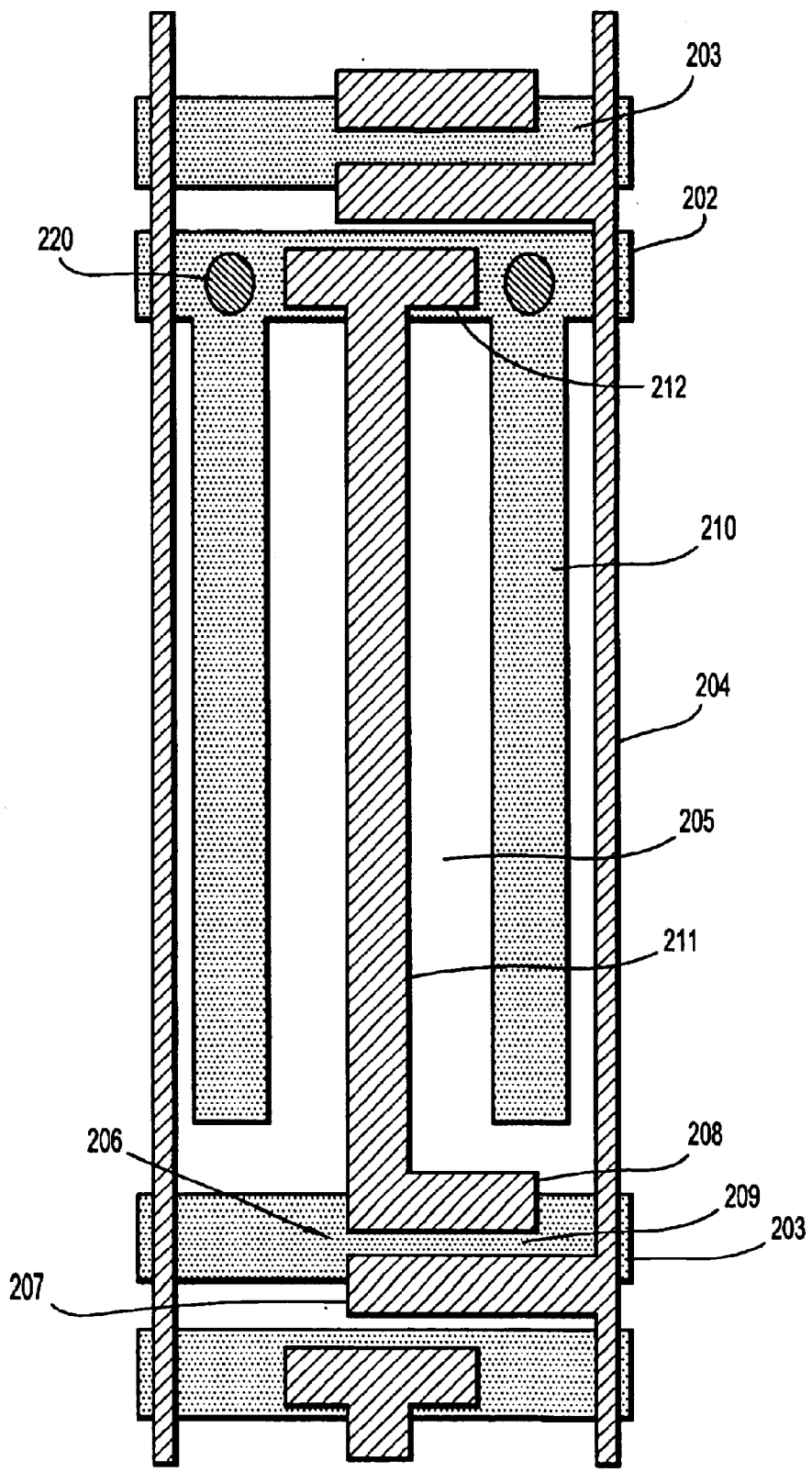
FIG. 3 is a schematic view showing a sub-pixel portion of this embodiment.

FIGS. 2 and 3 show a sub-pixel portion formed in the display pixel area in FIG. 1, which are diagrams showing a schematic configuration of the pixel portion on an array substrate. The portion shown in the figures shows a sub-pixel portion of each of R, G, and B constituting one pixel when performing color displaying. In FIGS. 2 and 3, reference numeral 202 denotes a plurality of pairs of common wirings extending in one direction in parallel with each other and 203 denotes gate wirings extending in one direction in parallel with each other and arranged in parallel with the common wirings.

Reference numeral 204 denotes a plurality of source wirings extending in parallel with each other and arranged in a direction almost orthogonal to the common wiring 202 and the gate wiring 203. Reference numeral 205 denotes a sub-pixel portion on an array substrate, which is enclosed by the common wiring 202, gate wiring 203, and source wiring 204. Reference numeral 206 denotes a TFT serving as a switching device. The TFT 206 is constituted by arranging a source electrode 207 extending along the gate wiring 203 from the source wiring 204 and a drain electrode 208 in parallel with each other at both the sides of a constant channel 209. The gate wiring 203 is formed below the channel 209 formed of a semiconductor layer through an insulating film (not illustrated).

Two common electrodes (common electrode wirings) 210 extend downward in FIGS. 2 and 3 from the common wiring 202 along two source wirings 204 while the drain electrode 208 of the TFT 206 is connected to a pixel electrode (pixel electrode wiring) 211. The pixel electrode 211 extends upward in parallel with these two common electrodes 210 between the two common electrodes 210. Moreover, one sub-pixel is constituted so as to have a plurality of pairs of parallel electrodes and the orientation of liquid crystal is controlled in accordance with the intensity of an electric field between these electrodes.

Some of electric charges supplied from the source wiring 204 to the pixel electrode 211 through the TFT 206 are held by a storage capacitance 212. Reference numeral 220 denotes a common-electrode exposure portion. This is obtained by forming an opening on an insulating film formed between an alignment film (not illustrated) and a common electrode. The common electrode is electrically connected with the alignment film and a common potential is supplied to the alignment film. Specifically, the portion 220 is realized by opening a hole on an insulating film such as a gate insulating film or protective film covering the common electrode and common wiring for separating the common electrode and the common wiring from the alignment film. It is also possible to form the storage capacitance 212 on the gate wiring. Thereby, it is possible to further increase a capacity. A common electrode is formed of one of aluminum, molybdenum, tungsten, tantalum, and chromium or an alloy of them and a pixel electrode is formed of one of the above metals and indium tin oxide (ITO).

Figure 4:
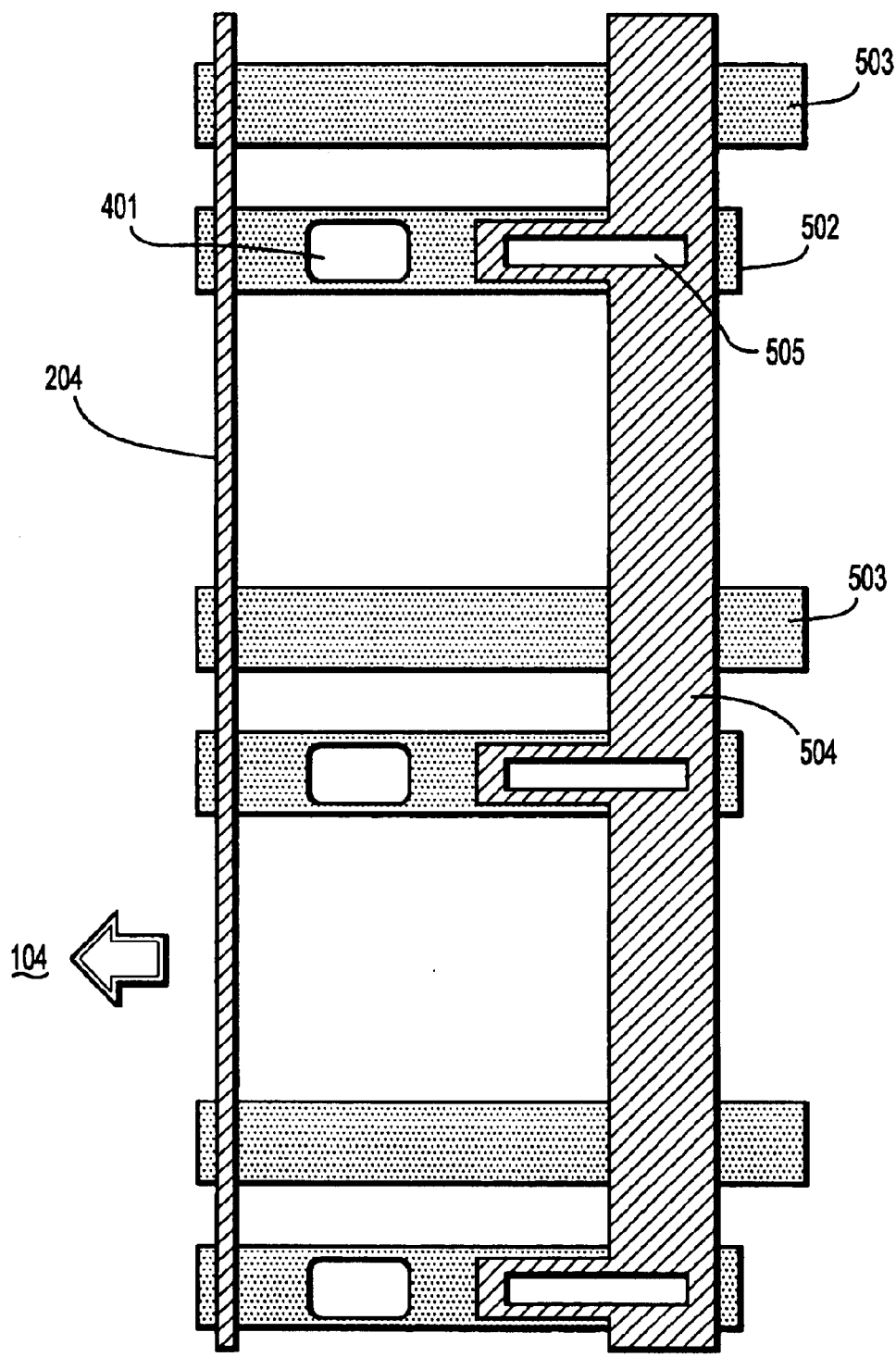
FIG. 4 is a schematic view showing the circumferential portion of a liquid-crystal cell of this embodiment.
Figure 5:
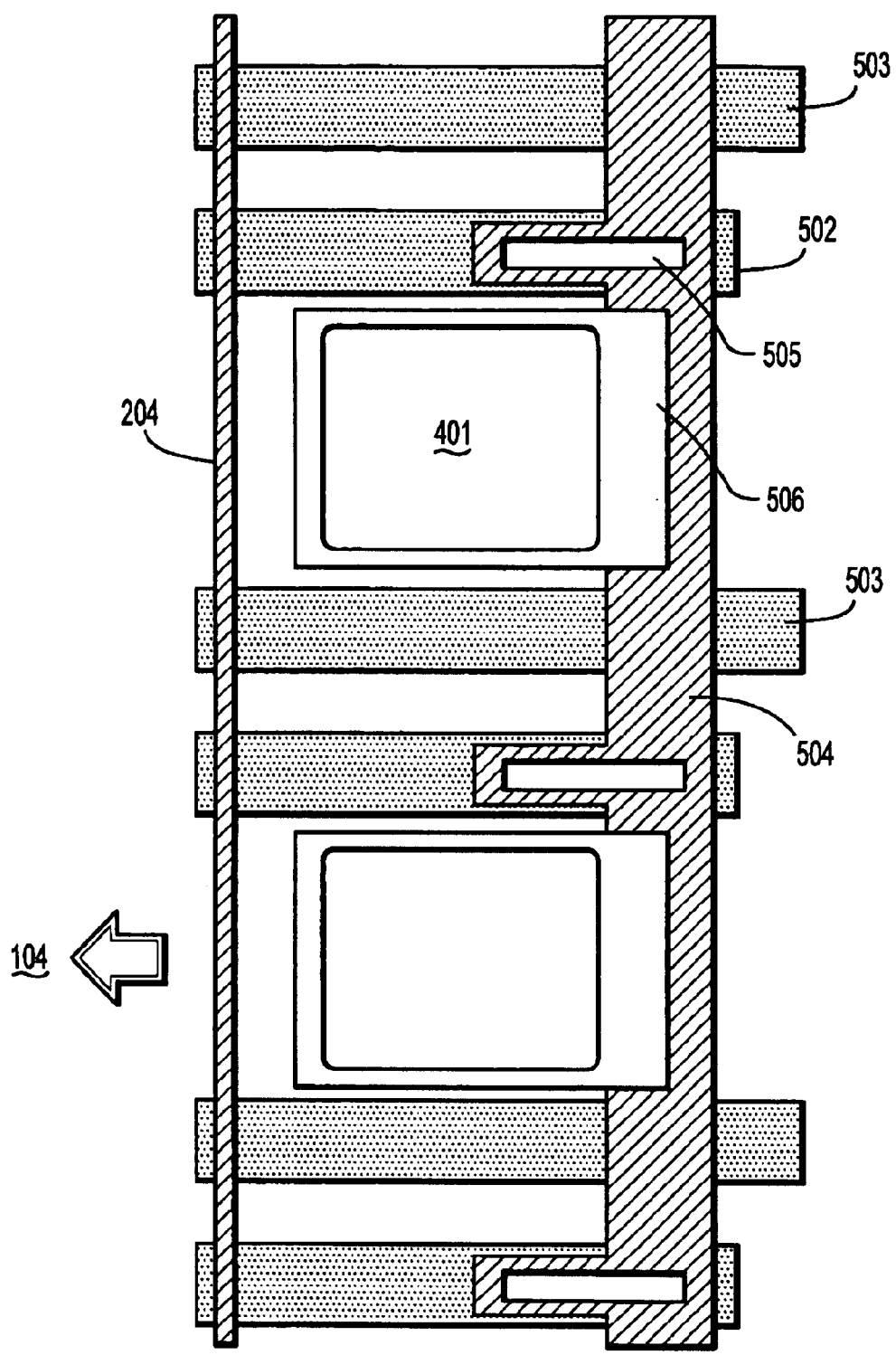
FIG. 5 is a schematic view showing a circumferential portion of a liquid-crystal cell of this embodiment.

FIGS. 4 and 5 are illustrations showing a display-screen circumferential area 105 on a TFT array substrate of the IPS-mode TFT liquid-crystal display of this embodiment, which are enlarged views showing a schematic configuration of a portion nearby a display pixel area 104. In FIG. 4, reference numeral 502 denotes a common wiring connected to the common wiring 202 in the display pixel area 104 and serving as one of common wirings for supplying a potential input from a driving circuit (not illustrated) and 503 denotes a gate wiring connected to the gate wiring 203 in the display pixel area 104 to supply a potential from the driving circuit.

Reference numeral 504 denotes a common-potential supply wiring which is one of common wirings for distributing a common potential input from a driving circuit to all common wirings 502 and 505 denotes a contact hole for connecting the common-potential supply wiring with the common wiring 502. Reference numeral 401 denotes a common-potential exposure portion. The portion 401 is realized by opening a hole on insulating films such as a gate insulating film and a protective film covering the common wirings for separating these common wirings from an alignment film (not illustrated). The alignment film is electrically connected with the common wirings through the openings and thereby, it is possible to supply a common potential to the alignment film. Each wiring and the alignment film are insulated from each other by an insulating layer and connected only at the common-potential exposure portion 401.

In FIG. 4, the common-potential exposure portion 401 is formed on the common wiring 502. Of course, it is also permitted to form an exposure portion on the common-potential supply wiring 504 and supply a common potential to the alignment film. In FIG. 5, a common potential is supplied to an alignment film through a third conductive layer 506. The third conductive layer is connected to the common-potential supply wiring 504. The third conductive layer can be formed of the same material as a common wiring or other conductive materials. When an insulating layer is present between the third conductive layer and the alignment film, an opening is formed on the insulating layer to electrically connect them together through the opening. Moreover, it is possible to bring the common-potential supply wiring 504 or third conductive layer 506 into contact with the alignment film in the circumferential area 105 without forming an insulating film between the wiring 504 or the layer 506 and the alignment film.

Thus, by forming a third conductive layer expanding by exceeding other wiring portions, it is possible to further secure electrical connection with an alignment film and moreover, decrease the number of exposure portions. It is not necessary to form the common-potential exposure portions 401 in the entire display-screen circumferential area 105 but it is permitted that the portions 401 are discretely distributed. Moreover, the above structure can be fabricated by deforming a mask pattern in the normal TFT-array fabrication process but the process is not described.

Figure 6:
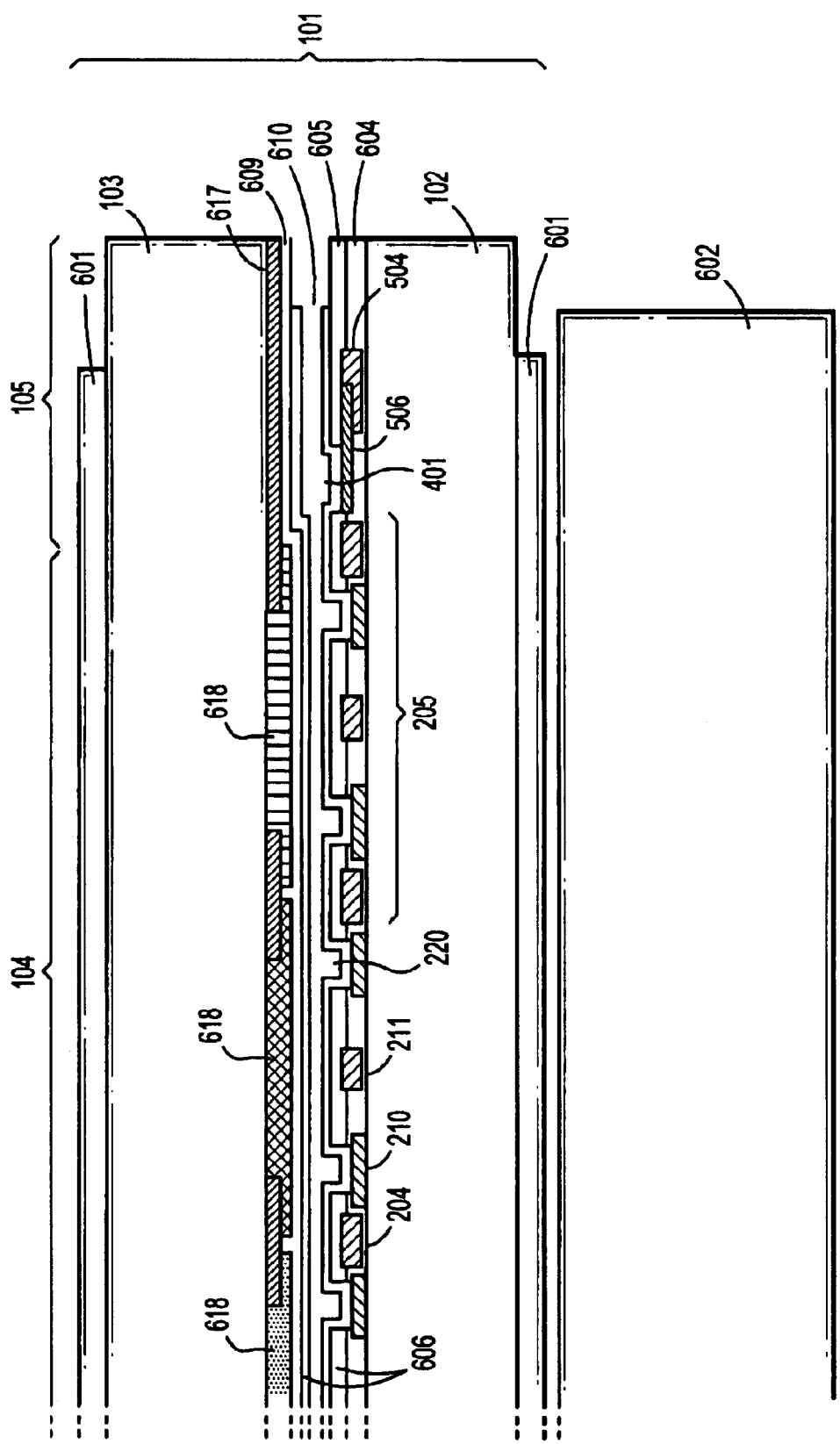
FIG. 6 is a schematic view showing a cross section of a liquid-crystal cell of this embodiment.
Figure 7:
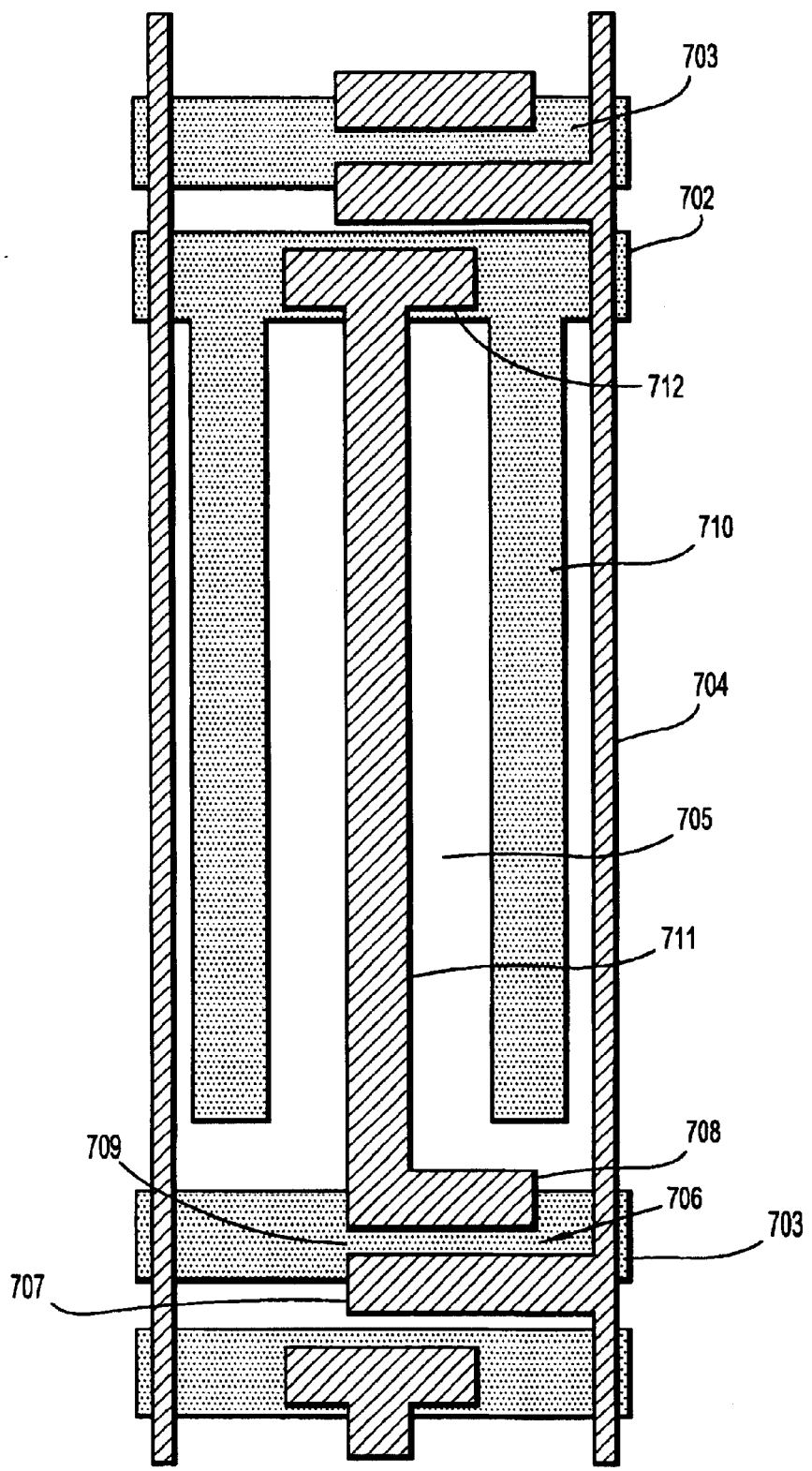
FIG. 7 is a schematic view showing a sub-pixel portion of the prior art.
Figure 8:
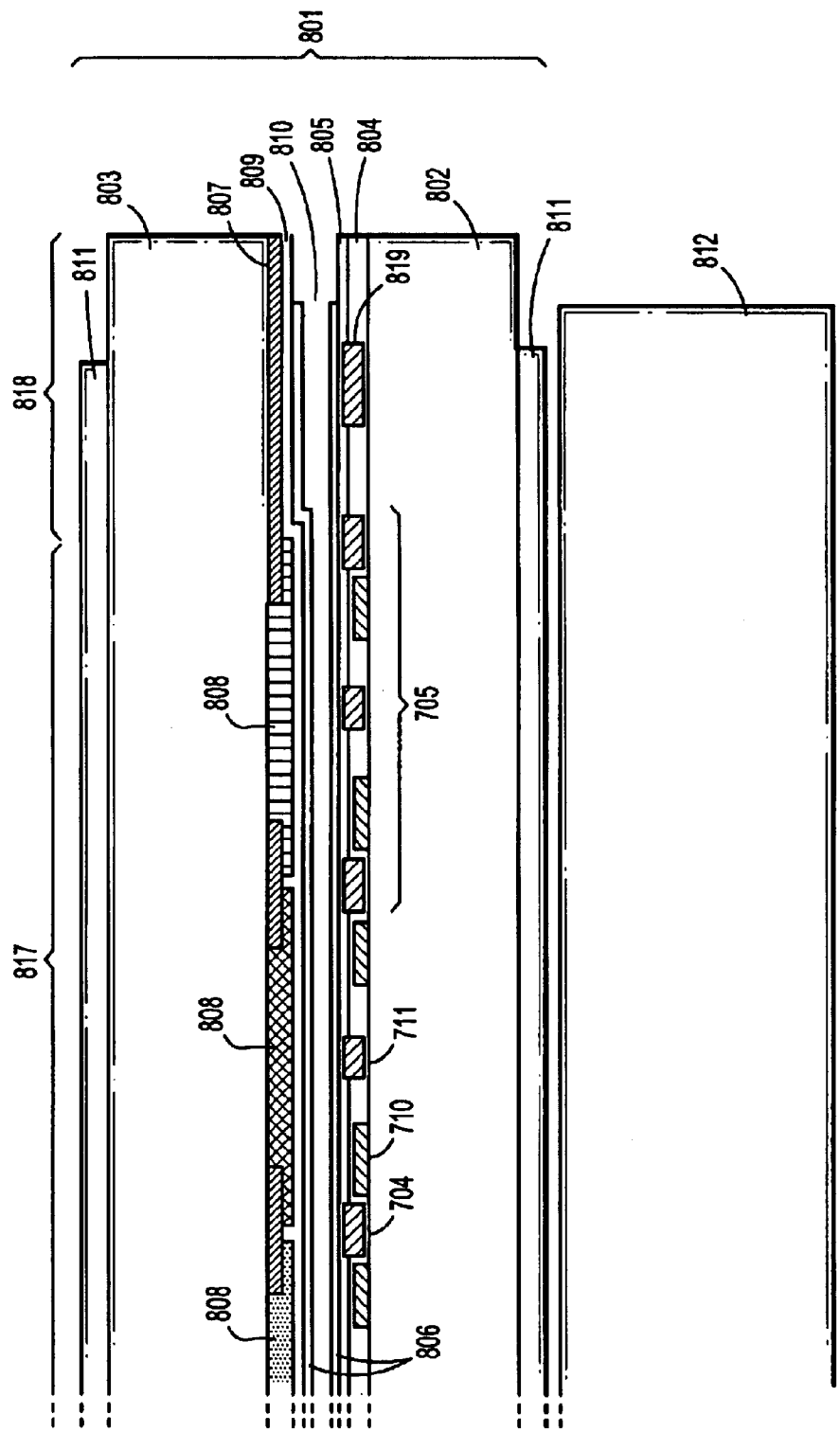
FIG. 8 is a schematic view showing a cross section of a liquid-crystal cell of the prior art.

FIG. 6 is a sectional view showing a configuration of a liquid-crystal cell of the IPS-mode TFT liquid-crystal display of this embodiment. In FIG. 6, reference numeral 102 denotes a TFT array substrate. The third conductive layer 506 is connected to the common-potential supply wiring 504. A gate insulating film 604 and a passivation film 605 are formed on the TFT array substrate 102. Openings of the gate insulating film 604 and passivation film 605 are present on the common electrode 210 and the third conductive layer 506 and the common-potential exposure portion 220 or 401 is formed. The gate insulating film 604 and passivation film 605 are respectively made of a silicon oxide film, silicon nitride film, titanium oxide film, aluminum oxide film, acrylic resin film, or other organic macromolecular film and respectively have a thickness of several hundred nanometers to several microns.

Moreover, it is preferable that the common-electrode exposure portion 220 in a sub-pixel has several ten square microns to several hundred square microns. It is preferable that the common-electrode exposure portion 401 in a circumferential area has several ten square microns to several ten thousand square microns. A black matrix 617 having a function for shading the boundary between pixels 205 and the display-screen circumferential area 105, a color filter 618 having a function for dividing light into three primary colors of RGB, and a protective film 609 are formed on the counter substrate 103.

The TFT array substrate 102 and the counter substrate 103 are arranged in parallel with each other while keeping a predetermined gap between them and liquid crystal 610 is sealed between them. An alignment film 606 for determining the initial orientation of the liquid crystal 610 is formed on faced surfaces of the two substrates. Moreover, a polarization film 601 is formed on outside surfaces of the two substrates. Reference numeral 602 denotes a backlight.

Operations will be described below. Electrical signals including video information, that is, a scanning signal and a video signal are input to the TFT array substrate 102 from a driving circuit (not illustrated). These video signals are transmitted to the sub-pixel 205 of the display area 104 through a wiring formed on the circumferential area 105. A scanning signal is input from the gate wiring 503 and passes through the gate wiring 203 in the sub-pixel to control the gate of the TFT 206. A signal input to the source wiring 204 is supplied to the pixel electrode 211 in the pixels 205 arranged like a matrix in the display pixel area 104 through the TFT 206.

Moreover, a common potential is input to the common-potential supply wiring 504 of the circumferential area 105 and distributed to the common electrodes 210 in the pixel 205 through the common wiring 502 and the common wiring 202 in the sub-pixel. Moreover, the common potential is supplied to the third conductive layer 506 connected to the common-potential supply wiring 504. Because potentials different from each other are supplied to the common electrode 210 and the pixel electrode 211, an electric field is generated between the two electrodes, which works on the liquid crystal 610 whose initial orientation is determined in a direction different from the electric field by the alignment film 606 and orientations of the liquid crystal are changed.

A voltage having a predetermined amplitude centering around a potential close to a common-electrode potential is supplied to the pixel electrode. For example, Vc–Va is supplied to the next frame to which Vc+Va is supplied. Vc is the voltage center, which is a voltage close to or almost equal to Vcom (common potential). Specifically, for example, voltages of Vc=10V and Va=0 to 8V, and Vcom= 9.5V are applied. In this case, light transmittances of a pixel are changed depending on the magnitude of Va. In a normally black mode, brightness rises when the magnitude of Va increases. A common potential reaches a value very close to an average potential in a screen. Moreover, the average of gate potentials supplied to a gate wiring is equal to not much exceeding −10V of the common potential. Furthermore, the common potential is not always kept constant and it is possible to supply an AC potential having a predetermined average potential.

A common potential almost equal to an average potential of a screen is supplied to the alignment film 606 through the common-potential exposure portion 220 in the display pixel area 104 and through the common-potential exposure portion 401 in the display-screen circumferential area 105. Therefore, it is possible to cancel the effect of a deviated electric field in a direction passing through an alignment film nearby these portions 220 and 401. As a result, it is possible to prevent impurity ions from collecting on the alignment film 606.

As described above, in the case of this embodiment, a common potential almost equal to an average potential in a screen is supplied to an alignment film through a common-potential exposure portion. Therefore, it is possible to prevent impurity ions from remaining in or on the alignment film. As a result, it is possible to prevent screen display troubles or deterioration caused by the impurity ions.

In the case of this embodiment, a pixel electrode and an alignment film in a sub-pixel are electrically insulated from each other. This is because, if the pixel electrode is connected with the alignment film, a problem occurs when a disconnection or short circuit occurs in the pixel electrode. Particularly, a problem occurs when the pixel electrode and a gate wiring are short-circuited. This is because, if the pixel electrode is connected with the alignment film, the gate wiring is connected with the alignment film through the pixel electrode, the potential of the alignment film greatly lowers compared to the average potential in a screen and thereby, impurity ions are collected.

Moreover, when an alignment film on a TFT array substrate is connected with a common wiring through a common-potential exposure portion, alignment films on the entire surface of a display pixel area are kept at almost the same potential. Therefore, it is possible to prevent screen display troubles or deterioration caused by static electricity charging in a fabrication process or when an end product is used.

Many deformations or modifications of this embodiment are permitted. For example, in the case of the example shown in FIG. 2, the common-potential exposure portion 220 is formed on almost all areas on the common electrode 210. However, as shown in FIG. 3, it is permitted to form the common-potential exposure portion 220 on a narrow limited area such as the common electrode 210 or common wiring 202. Moreover, it is not necessary that the common-potential exposure portion 220 is formed on all sub-pixels arranged like a matrix in the display pixel area 104 but it is permitted that the portions 220 are discretely distributed.

Furthermore, the present invention is applied not only to an IPS-mode TFT liquid-crystal display. It can also be applied to a case in which a common electrode is formed on a counter substrate such as the TN mode or VA mode. In general, in the display-screen circumferential area 105, an alignment film on a TFT array substrate is electrically floated. Therefore, in all cases including such a case when a common electrode is formed on a counter substrate, which can be an object to which the present invention is applied, a common potential is input onto a TFT array substrate from a driving circuit and supplied to the common electrode on the counter substrate via a transfer. Therefore, it is possible to easily connect an alignment film with a common wiring on the array substrate.

What is claimed is:

1. A liquid-crystal display, comprising an array substrate, a counter substrate facing the array substrate, and a liquid crystal sealed between the two substrates, wherein:

the liquid-crystal display includes a plurality of sub-pixel portions respectively having a switching device arranged like a matrix defining a pixel region and a circumferential area formed on the circumference of the pixel region of the liquid-crystal display, the sub-pixel portion is provided with a pixel electrode wiring and a common electrode wiring for applying an electric field to the liquid crystal and alignment film for controlling an alignment direction of the liquid crystal;

a pixel potential is supplied to the pixel electrode wiring through the switching device;

a common potential is supplied to the common electrode wiring; and the alignment film is insulated from the pixel electrode wiring and electrically connected to the common electrode wiring in the circumferential area of the pixel region of the liquid-crystal display.

2. The liquid-crystal display according to claim 1, wherein:

the sub-pixel portion is provided with the pixel electrode wiring and the common electrode wiring on the array substrate, an insulating film between the pixel electrode wiring and the alignment film, and an insulating film between the common electrode wiring and the alignment film; and the common electrode wiring and the alignment film are electrically connected to each other through an opening formed on the insulating film.

3. The liquid-crystal display according to claim 2, wherein the opening is formed between the common electrode wiring and the alignment film.

4. The liquid-crystal display according to claim 2, wherein:

the sub-pixel portion is further provided with a common wiring for supplying a common potential to the common electrode wiring; and the opening is formed between the common wiring and the alignment film.

5. A liquid-crystal display, comprising an array substrate, a counter substrate facing the array substrate, and a liquid crystal sealed between the two substrates, wherein:

the liquid-crystal display includes a plurality of sub-pixel portions respectively having a switching device arranged like a matrix defining a pixel region and a circumferential area formed on the circumference of the pixel region of the liquid-crystal display, the sub-pixel portion is provided with a pixel electrode wiring and a common electrode wiring for applying an electric field to the liquid crystal and alignment film for controlling an alignment direction of the liquid crystal wherein the sub-pixel portion is provided with the pixel electrode wiring and the common electrode wiring on the array substrate, an insulating film between the pixel electrode wiring and the alignment film, and an insulating film between the common electrode wiring and the alignment film and the common electrode wiring and the alignment film are electrically connected to each other through an opening formed on the insulating film, and is further provided with a conductor portion electrically connected to the common electrode wiring and the conductor portion is electrically connected to the alignment film wherein the conductor portion is formed by exceeding the common electrode wiring and the alignment film contacts with and electrically connects with the conductor portion;

a pixel potential is supplied to the pixel electrode wiring through the switching device;

a common potential is supplied to the common electrode wiring; and the alignment film is insulated from the pixel electrode wiring and electrically connected to the common electrode wiring in the circumference of the pixel region of the liquid-crystal display.

6. A liquid-crystal display, comprising an array substrate, a counter substrate facing the array substrate, and a liquid crystal sealed between the two substrates, wherein:

a display screen area provided with a plurality of sub-pixel portions defining a pixel region and a circumferential area formed on the circumference of the pixel region of the display screen area are included;

the sub-pixel portion has a switching device, the circumferential area of the pixel region of the display screen area is provided with a connection wiring to the sub-pixel portions, the connection wiring comprises a common wiring for supplying a common potential to the sub-pixel portions and a wiring for supplying a signal to the switching device; and the alignment film is electrically connected to the common wiring in the circumferential area of the pixel region of the display screen area.

7. The liquid-crystal display according to claim 6, wherein:

the wiring is a gate wiring for supplying a signal to a gate of the switching device; and the alignment film is insulated from the gate wiring.

8. The liquid-crystal display according to claim 6, wherein:

the circumferential area is provided with an insulating film between the common wiring and the alignment film; and the alignment film and the common wiring are electrically connected to each other through an opening formed on the insulating film.

9. The liquid-crystal display according to claim 7, wherein:

the circumferential area is provided with an insulating film between the gate wiring and the alignment film, and an insulating film between the common wiring and the alignment film; and the alignment film and the common wiring are electrically connected to each other through an opening formed on the insulating film.

* * * * *